United States Patent Office 3,830,848
Patented Aug. 20, 1974

3,830,848
DIPHENYL DERIVATIVES
Adolf Emil Siegrist, Basel, Switzerland, assignor to
Ciba-Geigy AG, Basel, Switzerland
No Drawing. Filed Sept. 30, 1971, Ser. No. 185,108
Claims priority, application Switzerland, Oct. 1, 1970,
14,516/70
Int. Cl. C07c 147/06
U.S. Cl. 260—607 A    2 Claims

ABSTRACT OF THE DISCLOSURE

The invention deals with new diphenyl derivatives of the formula

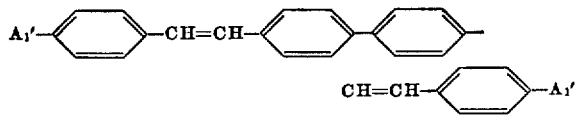

wherein $A_1'$ represents a radical

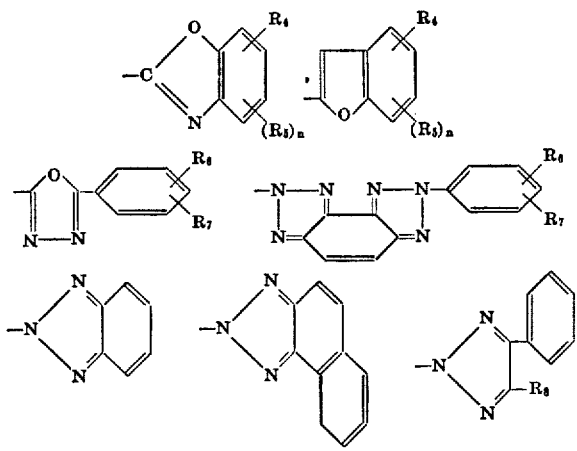

wherein $R_4$ denotes hydrogen, methoxy, an alkyl group containing 1 to 12 carbon atoms, a phenylalkyl group with 1 to 8 carbon atoms in the alkyl part, a phenyl group or chlorine, $R_5$ denotes hydrogen or an alkyl group containing 1 to 4 carbon atoms, $R_6$ denotes hydrogen, chlorine or an alkoxy group containing 1 to 8 carbon atoms, an alkyl group containing 2 to 4 carbon atoms or a phenyl group, $R_7$ denotes hydrogen, chlorine or an alkyl group containing 2 to 4 carbon atoms and $R_8$ denotes hydrogen or phenyl, and $n$ represents an integer from 1 to 2.

The said compounds are valuable fluorescent whitening agents. They are prepared by means of the anilesynthesis.

The present invention relates to a new process for the manufacture of distyryl derivatives of diphenyl, a new group of distyryl derivatives of diphenyl, and their use as optical brighteners for organic materials.

It is already known to synthesize styryl compounds by reacting a Schiff's base with the reactive methyl group of a tolyl grouping in the presence of strong alkalis, in dimethylformamide. In all these cases, however, a monofunctional Schiff's base was reacted, since first attempts to react difunctional Schiff's bases failed.

It has now been found that the reaction of difunctional Schiff's bases with a reactive tolyl grouping succeeds if selected Schiff's bases are used. Accordingly, the process of the invention permits the manufacture of 4,4'-(distyryl)-diphenyl compounds of the general formula (1) 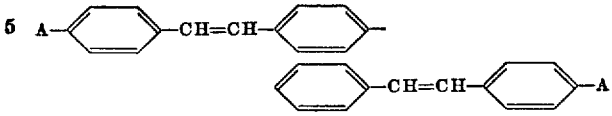

wherein A denotes a sulphonic acid dialkylamide, sulphonic acid alkylarylamide, carboxylic acid dialkylamide, carboxylic acid alkylarylamide, phenylsulphonyl, phenylcarbonyl, benzoxazol-2-yl, benzo[b]-furan-2-yl, 1,3,4-oxadiazol-2-yl, v-1,2,3-triazol-2-yl, benzo - 1,2,3-triazol-2-yl, naphtho[1,2-d] - 1,2,3-triazol - 2 - yl, benzo[1,2-d: 3,4-d'] - bis - 1,2,3-triazol - 2 - yl or pyridyl-4 radical, and this radical A can optionally contain non-chromophoric substituents but must be free of hydrogen atoms which are capable of reacting with alkali metal under the reaction conditions defined below. The process is characterised in that a Schiff's base of the formula (2) 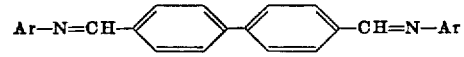

wherein Ar denotes an optionally substituted benzene radical, is reacted in the molar ratio of 1:2 with a compound of the formula (3) 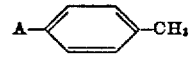

wherein A has the above-mentioned meaning, in dimethylformamide, in the presence of a potassium compound of the formula (4)    $KOC_{x-1}H_{2x-1}$ wherein $x$ represents an integer from 1 to 6.

The process according to the invention is particularly suitable for the manufacture of compounds of the formula (5) 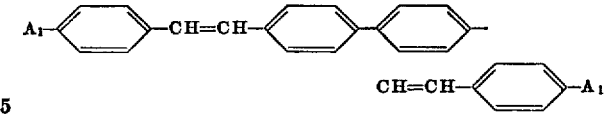

wherein $A_1$ represents one of the radicals

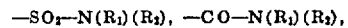

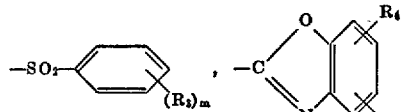

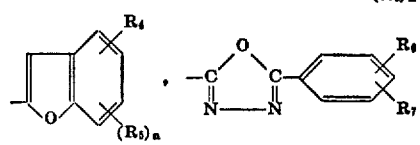

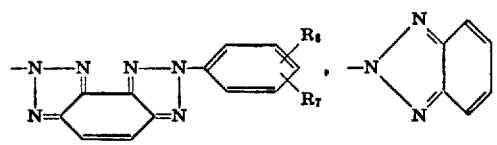

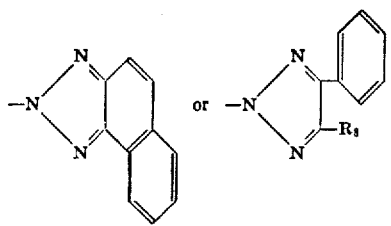

wherein $R_1$ denotes an alkyl group containing 1 to 8 carbon atoms, or denotes phenyl, $R_2$ denotes an alkyl group containing 1 to 8 carbon atoms, $R_3$ denotes hydrogen or an alkyl group containing 2 to 8 carbon atoms, $R_4$ denotes hydrogen, methoxy, an alkyl group containing 1 to 12 carbon atoms, a phenylalkyl group with 1 to 8 carbon atoms in the alkyl part, a phenyl group or chlorine, $R_5$ denotes hydrogen or an alkyl group containing 1 to 4 carbon atoms, $R_6$ denotes hydrogen, chlorine, an alkoxy group containing 1 to 8 carbon atoms, an alkyl group containing 2 to 4 carbon atoms or a phenyl group, $R_7$ denotes hydrogen, chlorine or an alkyl group containing 2 to 4 carbon atoms and $R_8$ denotes hydrogen or phenyl, $m$ represents an integer from 1 to 3 and $n$ represents an integer from 1 to 2.

Compounds of the above formula (5) are manufactured if a Schiff's base of the formula (2) 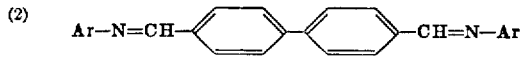

wherein Ar denotes an optionally substituted benzene radical, is reacted with a compound of the formula (6) 

wherein $A_1$ has the above-mentioned meaning.

Within the framework of the formula (5), an interesting group of new compounds, which is distinguished by a pronounced greenish-tinged blue fluorescence, should be singled out. These compounds correspond to the formula (7) 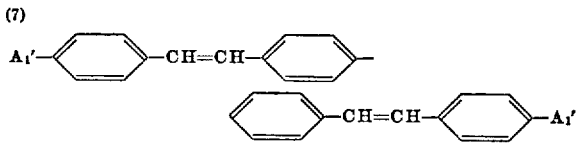

wherein R' represents a radical of the formula

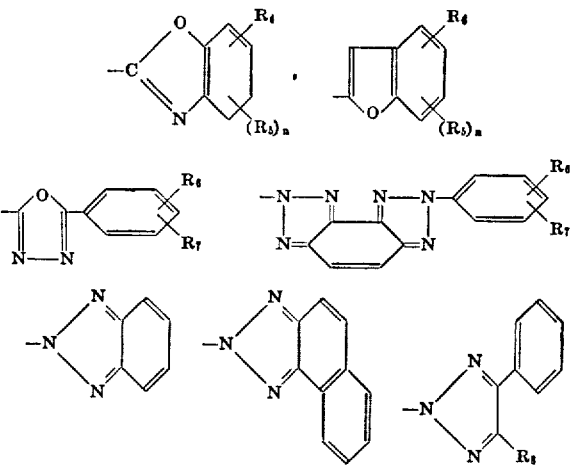

wherein $R_4$ denotes hydrogen, methoxy, an alkyl group containing 1 to 12 carbon atoms, a phenylalkyl group with 1 to 8 carbon atoms in the alkyl part, a phenyl group or chlorine, $R_5$ denotes hydrogen or an alkyl group containing 1 to 4 carbon atoms, $R_6$ denotes hydrogen, chlorine or an alkoxy group containing 1 to 8 carbon atoms, an alkyl group containing 2 to 4 carbon atoms or a phenyl group, $R_7$ denotes hydrogen, chlorine or an alkyl group containing 2 to 4 carbon atoms and $R_8$ denotes hydrogen or phenyl, and $n$ represents an integer from 1 to 2.

Compounds of this nature can be manufactured as indicated under formulae (2), (5) and (6).

A preferred group of compounds within the framework of the formula (7) is the group according to the formula (8)

(8) 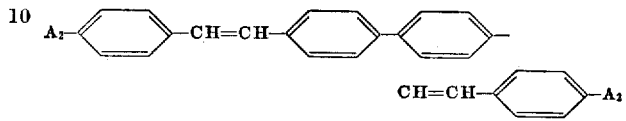

wherein $A_2$ represents a radical of the formula

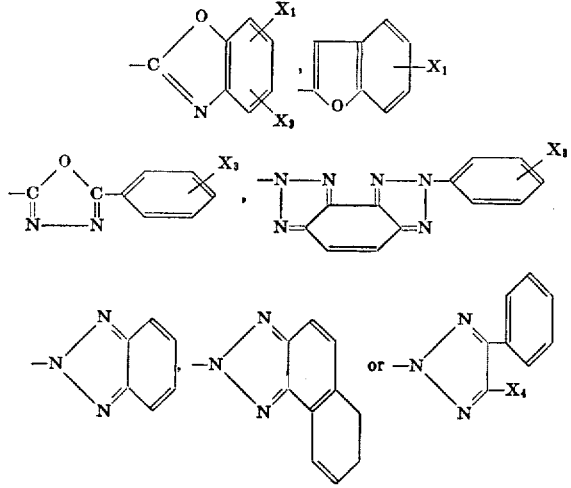

wherein $X_1$ denotes hydrogen, methoxy, an alkyl group containing 1 to 8 carbon atoms, a phenylalkyl group with 1 to 8 carbon atoms in the alkyl part, a phenyl group or chlorine, $X_2$ denotes hydrogen or an alkyl group containing 1 to 4 carbon atoms, $X_3$ denotes hydrogen, halogen, an alkoxy group containing 1 to 2 carbon atoms, an alkyl group containing 2 to 4 carbon atoms or phenyl and $X_4$ represents hydrogen or phenyl. Compounds of the formula (8) are obtained in a compound of the formula (2) 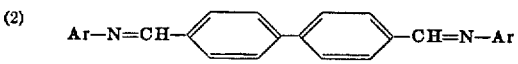

wherein Ar represents an optionally substituted benzene radical, is reacted with a compound of the formula (9) 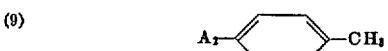

wherein $A_2$ has the above-mentioned meaning.

Compounds which can be manufactured advantageously in accordance with the process of the invention correspond to the following formulae:

(a) Compounds of the formula

(10) 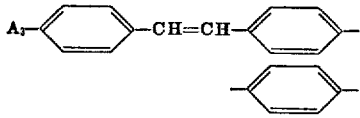

wherein $A_3$ represents a radical

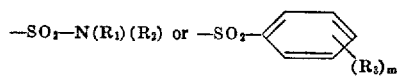

wherein $R_1$ denotes an alkyl group containing 1 to 8 carbon atoms or denotes phenyl, $R_2$ denotes an alkyl group containing 1 to 8 carbon atoms, $R_3$ denotes hydrogen or an alkyl group containing 2 to 8 carbon atoms and $m$ represents an integer from 1 to 3.

These compounds are obtained if a Schiff's base of the formula (2) 

is reacted with a compound of the formula

(11) 

(b) Compounds of the formula

(12) 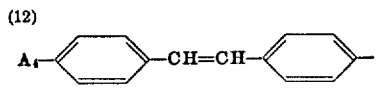

wherein $A_4$ represents a radical

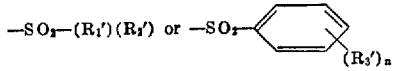

wherein $R_1'$ and $R_2'$ denote an alykl radical containing 1 to 4 carbon atoms and $R_3'$ denotes hydrogen or an alkyl radical containing 2 to 4 carbon atoms and $n$ represents the numbers 1 or 2.

These compounds can also be obtained analogously to the above procedures, by reacting a Schiff's base of the formula (2) 

with a compound of the formula

(13) 

wherein $A_4$ has the above-mentioned meaning.

As compounds which can be manufactured in an entirely analogous manner but which are particularly suitable for use as optical brighteners for polyester spinning compositions and for polyurethane coatings, there should be mentioned the types according to formulae (14) and (15):

(14) 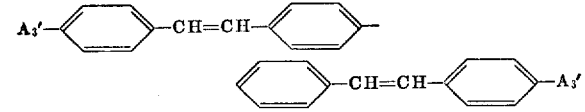

wherein $A_3'$ represents a radical of the formula

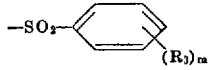

and wherein $R_3$ denotes hydrogen or an alkyl group containing 2 to 8 carbon atoms and $m$ represents an integer from 1 to 3, and the radicals $R_3$ can be identical or different from one another and at least one radical $R_3$ is not hydrogen.

Compounds of the formula

(15) 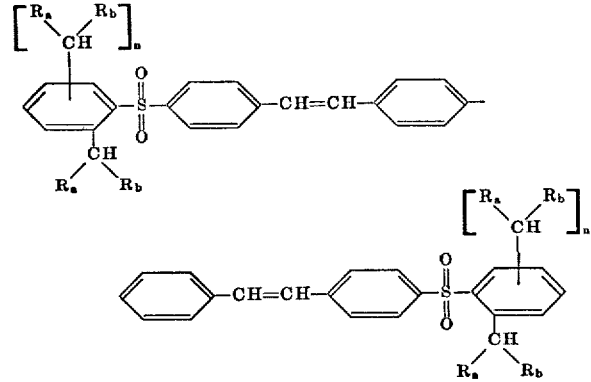

wherein $R_a$ and $R_b$ are identical or different and represent an alkyl group containing 1 to 3 carbon atoms and $n$ represents the numbers 1 or 2.

The Schiff's base to be used as the second reactant in the present process must—as is obvious—be free of reactive methyl groups, for example of methyl groups in the p-position to the azomethine grouping. The Schiff's bases in question are, in turn, the (known) condensation products of p,p'-diphenyldialdehyde with primary amines. Though these primary amines can be of aliphatic, carbocyclic-aromatic or heterocyclic nature, for economic reasons above all those are used which—apart from aniline itself—are derivatives of aniline. This is mainly due to the fact that the amine radical, in particular the aniline radical, is split off during the reaction and is no longer present in the end product. Nevertheless, substituents which do not hinder the reaction or, as, for example, chlorine atoms, even accelerate the reaction, can also be present in this ring. Schiff's bases of the formula

(16) 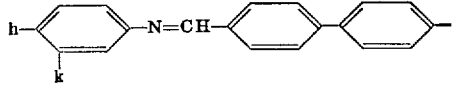

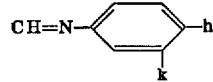

wherein $h$ and $k$ are identical or different and can represent hydrogen, chlorine, methoxy or alkyl with 2 to 12 carbon atoms, are of preferred interest.

Suitable amines for forming the Schiff's bases are, for example, aniline, chloroanilines and anisidines.

The reactants carrying methyl groups (for example of the formulae (3), (9), (11), (13) and the like), are reacted with the Schiff's bases in the presence of dimethylformamide as the solvent.

Additionally, a strongly basic alkali compound is required for the reaction. By strongly basic alkali compounds there are to be understood, within the framework of the present invention, those compounds of the alkali metals (main group I of the periodic system of the elements) including compounds of ammonium, which have a base strength of at least approximately that of lithium hydroxide. Accordingly, these may be compounds of lithium, sodium, potassium, rubidium, caesium or ammonium of the type of, for example, the alcoholates, hydroxides, amides, hydrides or sulphides, or strongly basic ion exchanges. For practical reasons (above all if mild reaction conditions, as regards the reaction temperature, appear indicated) potassium compounds of the composition (4) $\text{KOC}_{x-1}\text{H}_{2x-1}$, 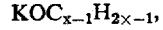

are normally used, wherein $x$ represents an integer from 1 to 6, such as, for example, potassium hydroxide or potassium tertiary-butylate. In the case of alkali alcoholates and alkali amides (and hydrides) the reacton must be carried out in a practically anhydrous medium, whilst in the case of alkali hydroxides water contents of up to 25% (for example the presence of water of crystallisation) are permitted. In the case of potassium hydroxide, a water content of up to about 15% has proved suitable. As examples of other usable alkali compounds there may be mentioned sodium methylate, sodium hydroxide, sodium amide, lithium amide, lithium hydroxide, rubidium hydroxide, caesium hydroxide and the like. Of course it is also possible to work with mixtures of such bases.

Appropriately, the reactants containing methyl groups are reacted with the Schiff's bases in the stoichiometric ratio of 2:1, so that no significant excess of either component is present. Advantageously, at least the equivalent amount of the alkali compound is used, that is to say at least 2 mols of a compound with, for example, a KO group, per one mol of Schiff's base. When using potassium hydroxide, a 4-fold to 8-fold amount is preferably used.

The reaction according to the invention can generally be carried out at temperatures in the range of between about 10 and 150° C. If alcoholates are used as the potassium compound in the reaction, the reaction frequently already succeeds at room temperature, in which case no external supply of heat is necessary. When using potassium hydroxide it is in most cases necessary to carry out the process at a higher temperature. For example, the reaction mixture is slowly warmed to 30 to 100° C. and is then kept at this temperature for some time, for example ½ to 2 hours. The final substances can be worked up from the reaction mixtures in accordance with customary methods which are in themselves known.

A considerable number of compounds which are in themselves new but hitherto only accessible indirectly have become capable of manufacture in a simple manner by the process described above. A large number of new compounds proved capable of manufacture for the first time by the process according to the invention.

The new compounds defined above show a more or less pronounced fluorescence in the dissolved or finely divided state. They can be used for the optical brightening of the most diverse synthetic or semi-synthetic materials, or substances which contain such organic materials.

The following groups of organic materials, where optical brightening thereof is relevant, may be mentioned as examples of the above, without the survey given below being intended to express any restriction thereto:

(I). Synthetic organic high molecular materials:

(a) Polymerisation products based on organic compounds containing at least one polymerisable carbon-carbon double bond, that is to say their homopolymers or copolymers as well as their after-treatment products, such as, for example, crosslinking, grafting or degradation products, polymer blends or products obtaned by modification of reactive groups for example, polymers based on $\alpha,\beta$-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as, for example, ethylene, propylene, styrenes or dienes and also so-called ABS polymers), and polymers based on vinyl and vinylidene compounds (such as, for example, vinyl chloride, vinyl alcohol or vinylidene chloride), (b) Polymerisation products such as are, for example, obtainable by ring opening, for example, polyamides of the polycaprolactam type, and also polymers which are obtainable both via polyaddition and via polycondensation, such as polyethers or polyacetals, (c) Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyesters) or unsaturated (for example maleic acid dialcohol polycondensates as well as their crosslinking products with copolymerisable vinyl monomers), unbranched or branched (also based on higher-functional alcohols, such as, for example, alkyd resins) polyesters, polyamides (for example hexamethylenediamine adipate), maleate resins, melamine resins, their precondensates and analogues, polycarbonates and silicones, (d) Polyaddition products, such as polyurethanes (cross-linked and non-crosslinked) and epoxide resins.

(II) Semi-synthetic organic materials, for example, cellulose esters of varying degrees of esterification (so-called 2½-acetate or triacetate) or cellulose ethers, regenerated cellulose (viscose or cuprammonium cellulose), or their after-treatment products, and casein plastics.

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection mouldings, various machined articles, chips, granules or foams, and also predominantly two-dimensional bodies such as films, foils, lacquers, coatings, impregnations and laminations or predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics, textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments, or in the form of hanks, woven fabrics, knitted fabrics, fleeces, flock substrates or laminates, are to be optically brightened according to the invention, this is advantageously effected in an aqueous medium, wherein the compounds in question are present in a finely divided form (suspensions, so-called micro-dispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20 to 140° C., for example at the boiling point of the bath or near it (about 90° C.).

Solutions or emulsions in organic solvents can also be use for the finishing, according to the invention, of textile substrates, as is practised in the dyeing trade in so-called solvent dyeing (pad-thermofix application, or exhaustion dyeing processes in dyeing machines).

The new optical brighteners according to the present invention can further be added to, or incorporated into, the materials before or during their shaping. Thus they can, for example, be added to the compression moulding composition or injection moulding composition during the manufacture of films, sheets (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:

(a) Mixed with dyestuffs (shading) or pigments (coloured or, especially, for example, white pigments), (b) Mixed with so-called "carriers," wetting agents, plasticisers, swelling agents, anti-oxidants, light protection agents and heat stabilisers.

(c) Mixed with crosslinking agents or finishes (for example starch or synthetic finishes), and in combination with the most diverse textile finishing processes, especially synthetic resin finishes (for example creaseproof finishes, such as "wash-and-wear," "permanent-press" or "no-iron"), as well as flameproof finishes, soft handle finishes, anti-soiling finishes or antistatic finishes, or antimicrobial finishes.

(d) Incorporation of the optical brighteners into polymeric carriers (polymerisation, polycondensation or polyaddition products), in a dissolved or dispersed form, for use, for example, in coating compositions, impregnating compositions or binders (solutions, dispersions and emulsions) for textiles, fleeces, paper and leather.

(e) As additive to so-called "master batches."

(f) As additives to the most diverse industrial products in order to render these more marketable (for example improving the appearance of pigments).

(g) In combination with other optically brightening substances.

(h) In spinning bath preparations, that is to say as additives to spinning baths such as are used for improving the slip for the further processing of synthetic fibres, or from a special bath before the stretching of the fibre.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrate, for example polyester fibres with the brighteners according to the invention is to impregnate these fibres with the aqueous dispersions (or, where appropriate, solutions) of the brighteners at temperatures below 75° C., for example at room temperature, and to subject them to a dry heat treatment at temperatures above 100° C., it being generally advisable additionally to dry the fibre material beforehand at a moderately elevated temperature, for example at not less than 60° C. and up to about 130° C. The heat treatment in the dry state is then advantageously carried out at temperatures between 120 and 225° C., for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and at times up to about 2 percent by weight can also be employed. For most practical purposes, amounts between 0.0005 and 0.5 percent by weight are of preferred interest.

In the examples, the parts, unless otherwise stated, are always parts by weight and the percentages are always percentages by weight. Unless otherwise stated, melting points and boiling points are uncorrected.

EXAMPLE 1

6.86 g. of 4 - methyl-4'-isopropyl-diphenylsulphone of the formula (17)

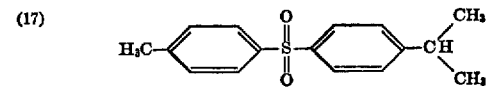

and 4.50 g. of the Schiff's base from 2 mols of aniline and 1 mol of diphenyl-4,4'-dialdehyde, of the formula (18)

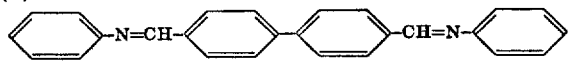

(melting point 242 to 243° C.) in 250 ml. of dimethylformamide are stirred with exclusion of air. The temperature is brought to 70° C. and 12.5 g. of potassium hydroxide powder, containing about 10% of water, are added all at once to the solution obtained, whereupon a red-violet colouration is produced immediately. The reaction mixture is stirred for 30 minutes at 70 to 75° C., and is thereafter cooled to about 20° C. After adding 400 ml. of methanol, the mixture is cooled to 5° C. and the product which precipitates is filtered off, washed with 200 ml. of methanol and dried.

8.7 g., corresponding to 96.7% of theory, of the compound of the formula (19)

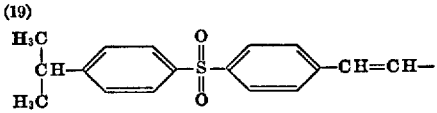

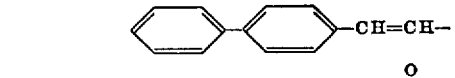

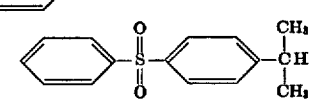

are obtained as a light yellow powder which melts above 360° C. Two recrystallisations from a large amount of o-dichlorobenzene (fuller's earth) yield 7.2 g. (80.0% of theory) of pale greenish-tinged yellow, very fine crystals having a melting point above 360° C.

Analysis: C$_{46}$H$_{42}$O$_4$S$_2$ (722.97). Calculated: C, 76.42; H, 5.86; O, 8.85. Found: C, 76.40; H, 5.84; O, 8.76.

The 4,4'-(distyryl)-diphenyl derivatives of the formula (20)

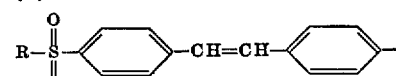

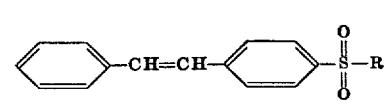

listed in the table below can be manufactured similarly.

| Formula number | R | Melting point (° C.) |
|---|---|---|
| 21 | —⟨phenyl⟩ | >350 |
| 22 | —⟨phenyl⟩—CH$_2$—CH$_2$—CH$_3$ | >350 |
| 23 | —⟨phenyl⟩—CH$_2$—CH$_2$—CH$_2$—CH$_3$ | >350 |
| 24 | —⟨phenyl⟩—CH(CH$_2$—CH$_3$)(CH$_3$) | >350 |
| 25 | —⟨phenyl⟩—C(CH$_3$)$_3$ | >350 |
| 26 | —⟨phenyl⟩—CH(CH$_2$—CH$_2$—CH$_3$)(CH$_3$) | >350 |

TABLE—Continued

| Formula number | R | Melting point (° C.) |
|---|---|---|
| 27 | H₃C, CH₃ CH, CH₃ CH, CH₃ CH, CH₃ | 261–262 |
| 28 | H₃C, CH₃ CH, CH, H₃C CH₃ | 271–272 |

EXAMPLE 2

4.98 g. of p-toluene-sulphodimethylamide of the formula (29)

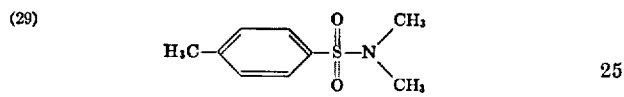

4.50 g. of the Schiff's base from 2 mols of aniline and 1 mol of diphenyl-4,4'-dialdehyde of the formula (18) and 12.5 g. of potassium hydroxide powder containing about 10% of water, in 200 ml. of dimethylformamide, are stirred whilst excluding air. The temperature is brought to 60° C. over the course of 30 minutes, in the course of which a violet colouration appears. The reaction mixture is stirred for 60 minutes at 60 to 65° C. After adding 400 ml. of methanol the mixture is cooled to 0° C. and the product which precipitates is filtered off, washed with 200 ml. of methanol and dried. 5.7 g., corresponding to 79.7% of theory, of the compound of the formula (30)

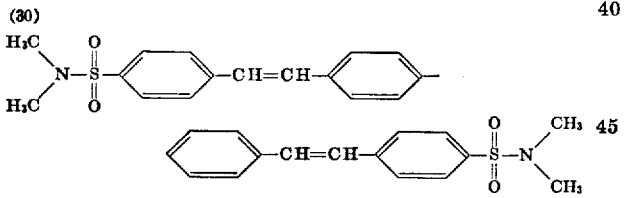

are obtained in the form of a light yellow powder which melts above 360° C. Two recrystallizations from o-dichlorobenzene (fuller's earth) yield 4.95 g. (69.2% of theory) of light greenish-tinged yellow fine felted small needles having a melting point above 360° C.

Analysis: C₃₂H₃₂N₂O₄S₂ (572.75). Calculated: C, 67.11; H, 5.63; N, 4.89; O, 11.17. Found: C, 67.01; H, 5.62; N, 5.04; O, 11.10.

The 4,4'-(distyryl)-diphenyl derivatives of the formula (31)

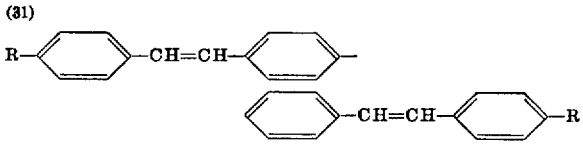

listed in the table which follows can be prepared similarly, but for compounds (36) and (37) 11.2 g. of potassium tert.butylate are used instead of 12.5 g. of potassium hydroxide powder and the reaction is carried out for 30 minutes at 90 to 95° C.

| Formula number | R | Melting point (° C.) |
|---|---|---|
| 32 | –C(=O)–C₆H₅ | >360 |
| 33 | –C(=O)– (benzoxazole with C(CH₃)₂–CH₃ substituent) | >360 |
| 34 | –C(=O)– (benzoxazole with C(CH₃)₂–phenyl substituent) | >360 |
| 35 | oxadiazole–phenyl | >360 |
| 36 | pyrazine with two phenyl groups, –N– | 283–284 |
| 37 | naphthimidazole, –N– | >360 |
| 38 | 2,6-diphenylpyridine | 318–319 |

EXAMPLE 3

100 parts of polyester granules of terephthalic acid ethylene glycol polyester are intimately mixed with 0.05 parts of a 4,4'-(distyryl)-diphenyl derivative of the formula (19), (21), (22), (23), (24), (25), (26), (27), (28) or (30) and the mixture is fused at 285° C. whilst stirring. After spinning the spinning composition through customary spinnerets strongly brightened polyester fibres are obtained.

The above-mentioned compounds can also be added to the starting substances before or during the polycondensation to give the polyester.

EXAMPLE 4

1.5 g. of a delustring agent, 1 g. of titanium dioxide (rutile type) and 0.05 g. of one of the 4,4'-(distyryl)-diphenyl derivatives of the formula (27) or (28) are stirred into a polyurethane coating composition of 13.3 g. of isocyanate-modified polyester, 26.7 g. of ethyl acetate, 2 g. of reaction accelertaor and 2 g. of polyfunctional isocyanate to act as a crosslinking agent. This mixture is left to stand for 2 hours and is then spread by means of a coating knife or a film-drawing rod onto a cotton fabric (wet film thickness 1 mm.). Thereafter the composition is dried for 24 hours at room temperature. The fabric coated in this way shows a strong optical brightening effect of good fastness to light.

I claim:

1. A compound of the formula

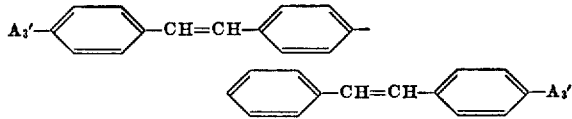

wherein $A_3'$ represents a radical of the formula

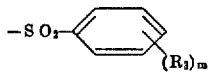

and wherein $R_3$ denotes hydrogen or an alkyl group containing 2 to 8 carbon atoms and $m$ represents an integer from 1 to 3, and the radicals $R_3$ can be identical or different from one another and at least one radical $R_3$ is not hydrogen.

2. A compound of the formula

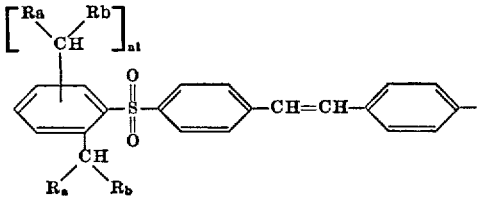

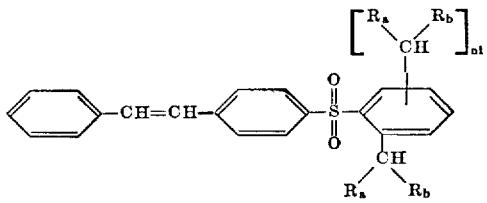

wherein $R_a$ and $R_b$ are identical or different and represent an alkyl group containing 1 to 3 carbon atoms, and $n$ represents the numbers 1 or 2.

References Cited

UNITED STATES PATENTS 3,260,715    7/1966    Saunders _____ 260—240 CA

FOREIGN PATENTS 7,525    4/1969    Japan _____ 260—240 CA

OTHER REFERENCES

Chemical Abstracts, vol. 67, pp. 2085–2086 (abstract No. 21858) (1967).

Chemical Abstracts, vol. 71, pp. 102-3 (abstract No. 71927) (1969).

Siegrist et al.: Helv. Chim. Acta., vol. 52, pp. 2521–2554 (1969).

JOHN D. RANDOLPH, Primary Examiner

U.S. Cl. X.R.

8—115.6; 106—148, 164, 167, 176; 117—33.5 R, 33.5 T, 134.9, 139.5 A, 139.5 R, 143 A; 162—162; 252—301.2 W, 399, 401, 402; 260—2 S, 29.1 R, 37 EP, 37 NP, 37 SB, 37 R, 39 P, 40 P, 41 Cl, 46.5 R, 47 EP, 77.5 R, 240 CA, 556 AR, 558 R, 566 R